United States Patent
Haulick et al.

(10) Patent No.: US 12,277,921 B2
(45) Date of Patent: Apr. 15, 2025

(54) IN-CABIN AUDIO FILTERING

(71) Applicant: Cerence Operating Company, Burlington, MA (US)

(72) Inventors: Tim Haulick, Ulm (DE); Markus Buck, Ulm (DE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 18/039,061

(22) PCT Filed: Oct. 29, 2021

(86) PCT No.: PCT/US2021/057175
§ 371 (c)(1),
(2) Date: May 26, 2023

(87) PCT Pub. No.: WO2022/119673
PCT Pub. Date: Jun. 9, 2022

(65) Prior Publication Data
US 2023/0419944 A1    Dec. 28, 2023

Related U.S. Application Data

(60) Provisional application No. 63/121,499, filed on Dec. 4, 2020.

(51) Int. Cl.
*G10K 11/178*   (2006.01)
*H04N 7/18*    (2006.01)
(Continued)

(52) U.S. Cl.
CPC .. *G10K 11/17837* (2018.01); *G10K 11/17823* (2018.01); *G10K 11/17827* (2018.01); *H04N 7/183* (2013.01); *H04N 23/62* (2023.01); *H04N 23/695* (2023.01); *G10K 2210/12821* (2013.01); *G10K 2210/3028* (2013.01); *G10K 2210/3046* (2013.01); *G10K 2210/3215* (2013.01)

(58) Field of Classification Search
None
See application file for complete search history.

(56) References Cited

U.S. PATENT DOCUMENTS 10,755,691 B1 *  8/2020  Herman ........... G10K 11/17853
2008/0273715 A1  11/2008  Snider et al.
(Continued)

FOREIGN PATENT DOCUMENTS

DE   102017107538 A1   10/2018

OTHER PUBLICATIONS

Kawase Tomoko et al., "Application of Neural Network to Source PSD estimation for Wiener Filter based Array Sound Source Enhancement," 2016 IEEE International Workshop on Accoustic Signal Enhancement (IWAENC), IEEE, Sep. 13, 2016, pp. 1-5 (XP032983149).

(Continued)

*Primary Examiner* — Kenny H Truong
(74) *Attorney, Agent, or Firm* — Occhiuti & Rohlicek LLP

(57) ABSTRACT

A vehicle includes a cabin, an internal-loudspeaker set an external-microphone set, and a signal processor that filters a raw audio signal that has been received by the external-microphone set broadcasts the resulting filtered audio signal into the cabin using the internal-loudspeaker set.

18 Claims, 8 Drawing Sheets

(51) Int. Cl.
  *H04N 23/62* (2023.01)
  *H04N 23/695* (2023.01)

(56) References Cited

U.S. PATENT DOCUMENTS

| | | |
|---|---|---|
| 2010/0033313 A1 | 2/2010 | Keady et al. |
| 2010/0131269 A1* | 5/2010 | Park ................ G10K 11/17857 |
| | | 381/71.1 |
| 2015/0036832 A1 | 2/2015 | Usher et al. |
| 2018/0075859 A1* | 3/2018 | Song ....................... G10L 25/84 |
| 2018/0270571 A1 | 9/2018 | Di Censo et al. |
| 2018/0335503 A1 | 11/2018 | Seifert et al. |
| 2019/0220248 A1 | 7/2019 | Cordourier Maruri et al. |
| 2019/0280664 A1 | 9/2019 | Kawauchi et al. |
| 2022/0130365 A1* | 4/2022 | Park ....................... H04R 1/025 |

OTHER PUBLICATIONS

International Search Report, PCT Application No. PCT/US2021/057175, mailed Feb. 8, 2022 (5 pages).

* cited by examiner

IN-CABIN AUDIO FILTERING

CROSS-REFERENCE TO RELATED APPLICATIONS

This application is a U.S. National Phase of PCT/US2021/057175, filed on Oct. 29, 2021, which claims the benefit of U.S. Provisional Application No. 63/121,499 filed Dec. 4, 2020, the contents of which are incorporated herein in their entirety.

BACKGROUND OF THE INVENTION

Regardless of whether it is that of a car, truck, or a van, a vehicle's cabin should be an oasis of silence. A quiet cabin offers welcome relief from environmental noise. Such noise can be self-inflicted, i.e., it can arise from the vehicle's own engine or from the vehicle's tires as they grip the road. Other environmental noise is that caused by external noise sources, such as horns or jackhammers.

Nevertheless, it is undesirable for the cabin to be completely isolated from the environment. There are, after all, sounds that are important to hear. Among these sounds, referred to herein as "desired audio signals," are those that signal danger. Examples include sirens from emergency vehicles, back-up sounds from nearby vehicles, proximity warnings from nearby vehicles and horns from nearby vehicles, including the sound of bicycle bells. Other examples are sounds that originate from living beings, such as animal noises, for example, the sound of barking dogs, or the crying or shouting children. Other examples include sounds with actual semantic content. These include specific safety-related utterances such as "Help!" or "Look out!".

There also exist desirable audio signals that are not necessarily related to safety. For example, there exist drive-ins with kiosks that require spoken interaction to place orders for food.

SUMMARY OF THE INVENTION

To mitigate the risk of the driver and/or passengers missing desirable audio signals, it is useful to provide circuitry to cause the technical effect of transmitting desirable audio signals into the driving cabin of a vehicle while continuing to passively or actively suppress unwanted noise.

In one aspect, the invention features a method that includes receiving a first audio signal from outside a vehicle's cabin and broadcasting a second audio signal into the vehicle's cabin via an inbound audio channel, the second audio signal comprising information contained in the first audio signal. In such a method, receiving the first audio signal includes using an external-microphone set to receive the first audio signal and broadcasting the second audio signal includes using an internal-loudspeaker set to broadcast the second audio signal. The internal-loudspeaker set includes one or more loudspeakers positioned inside the cabin. The external-microphone set includes one or more microphones that are outside the vehicle's cabin.

Some practices of the method include steering the external-microphone set and others include receiving an instruction from an occupant to steer the external-microphone set to form a beam that points to a designated angle.

Still other practices include displaying an image obtained outside the vehicle on a display in the cabin.

Yet other practices include filtering the audio signal, thereby producing a filtered audio signal. In such practices, broadcasting the signal through an internal-loudspeaker set includes broadcasting the filtered audio signal.

Some practices include identifying a threat in the raw audio signal or in the raw audio signal. Examples of such signals include a siren, a back-up alarm, a vehicle horn, a proximity warning from a vehicle, a bicycle bell, a dog's bark, a crying child, a shouting voice, and a spoken utterance. Among these are practices in which identifying the signal corresponding to a threat is carried out based on a machine-learning algorithm. A suitable machine-learning algorithm for such practices is one that has been trained on pre-selected signals. These pre-selected signals correspond to various kinds of threats.

A typical signal has various properties, among which are the property of being stationary and the property of being transitory. Some practices feature identifying such properties to distinguish among signals. Among these are practices that include distinguishing a stationary signal from a transitory signal.

Filters, and in particular, digital filters, come in many forms. In some practices, the filter that is used for application to the raw audio signal is a Wiener filter.

Some practices of the method include detecting a state change in a toggle control and responding to this state change in one of a variety of ways. Among the practices are those that respond to the state change by broadcasting the raw audio signal into the cabin and those that respond to the state change by broadcasting an audio signal in the opposite direction, namely broadcasting outside of the cabin. The latter practices includes using one or more microphones that are inside the cabin to detect an audio signal and then broadcasting that signal via one or more loudspeakers that are external to the driving cabin.

Still other practices include carrying out certain actions in response to detecting a state change. One such practice includes broadcasting the filtered audio signal into the cabin, detecting a state change, and, in response to the state change, broadcasting the raw audio signal into the cabin instead of the filtered audio signal. Another such practice includes broadcasting the filtered audio signal into the cabin, detecting a state change, and, in response to the state change, broadcasting an audio signal outside the cabin, the audio signal having originated inside the cabin.

Further practices include displaying a visual alert while broadcasting the filtered audio signal through the cabin loudspeaker(s). Among these practices are those in which the visual alert includes a characterization of the filtered audio signal. Examples of such characterizations include characterizations that identify the nature of the signal, for example whether the signal being broadcast is a siren, a back-up alarm, a vehicle horn, a proximity warning from a vehicle, a bicycle bell, a dog's bark, a crying child, a shouting voice, or a spoken utterance.

Among the additional practices are those that include displaying a visual characterization of the filtered audio signal while the filtered audio signal is being broadcast into the cabin. This visual characterization provides information indicative of the type of filtered audio signal that is being broadcast. Among these are practices in which the visual information is indicative of whether the filtered audio signal includes one of a siren, a back-up alarm, a vehicle horn, a proximity warning from a vehicle, a bicycle bell, a dog's bark, a crying child, a shouting voice, and a spoken utterance.

Further practices include selecting the filter that is to be applied to the raw audio signal based on the vehicle's state.

Also among the practices of the method are those that further include broadcasting sound that originated inside the vehicle outside the vehicle using an outbound audio channel. This outbound audio channel includes both an external-loudspeaker set that includes one or more exterior loudspeakers that are disposed to broadcast sound outside the vehicle and an internal-microphone set that includes one or more internal microphones positioned to receive an audio signal from inside the cabin.

Among the foregoing practices are those that include preventing the outbound audio channel from broadcasting the sound during a selected period. These, in turn, include practices in which preventing the outbound audio channel from broadcasting the sound during a selected period includes causing the outbound audio channel to broadcast noise outside the vehicle during the selected period, practices in which preventing the outbound audio channel from broadcasting the sound during a selected period includes silencing the outbound channel during the selected period, and practices in which preventing the outbound audio channel from broadcasting the sound during a selected period includes causing the outbound channel to broadcast selected programming outside the vehicle during the selected period.

For those cases in which the external-loudspeaker set includes a first external-loudspeaker and a second external-loudspeaker, there exist practices of the method that further include suppressing output of sound from the first external-loudspeaker while concurrently permitting the sound to be broadcast from the second external-loudspeaker.

Still other practices of the method include causing the sound to be broadcast on only one side of the vehicle.

Alternative practices of the method include applying first and second weights to first and second internal microphones, respectively, from the internal-microphone set. In such practices, the first and second weights differ in one or more of their respective real and imaginary parts or in one or more of their respective magnitudes and exponents.

Still other practices include those in which the various signal processing steps are carried out in the frequency domain, for example using a bank of filters and using a Fourier transform, such as that implemented using an FFT. In such cases, signals are represented by complex values. Embodiments include those in which filtering is carried out by changing the real and imaginary parts of the signal and those in which filtering is carried out using amplitude and phase of the signal. Among these are practices that include causing a time delay in a signal by incorporating a phase shift and those in which a time delay is caused by multiplying a signal by a complex exponential having an argument that is related to the desired delay. Among these practices are those in which the argument of the complex exponential is obtained by taking the ratio of the imaginary part to the real part and causing, as a delay, a value that corresponds to that phase angle having that ratio as a tangent thereof.

Still other practices include providing, to the external-loudspeaker set, an inner product of a weight vector and an internal-microphone vector, the internal-microphone vector including, as elements thereof, values representative of signals generated by corresponding internal microphones from the internal-microphone set.

In another aspect, the invention features a vehicle that includes a cabin and an inbound audio channel that includes an internal-loudspeaker set and an external-microphone set. The internal-loudspeaker set includes one or more loudspeakers disposed to radiate sound into the cabin. The external-microphone set includes one or more microphones disposed to receive a raw audio signal from outside the cabin.

Embodiments also include those in which the external-microphone set includes a microphone array having a steerable beam and those that include a user interface to permit an occupant of the cabin to steer a beam formed by the external-microphone set.

Also among the embodiments are those that include an external-camera system including a camera and a user interface that displays an image received by the camera and those that include a user interface to permit an occupant of the cabin to point a camera of an external-camera set to different locations outside the vehicle.

Among the embodiments are those that include a signal processor that is configured to apply a filter to the raw audio signal that has been received by the external-microphone set and to broadcast the resulting filtered audio signal into the cabin using the internal-loudspeaker set.

In some of the foregoing embodiments, the signal processor is further configured to identify a threat in the filtered audio signal. Among these are embodiments in which the signal processor is further configured to identify, in the filtered audio signal, at least one of a siren, a back-up alarm, a vehicle horn, a proximity warning from a vehicle, a bicycle bell, a dog's bark, a crying child, a shouting voice, and a spoken utterance and those in which the signal processor is further configured to identify a threat in the sound from outside the cabin and to do so based on a machine-learning algorithm that has been trained on pre-selected signals that correspond to threats.

Also among the embodiments that filter the raw audio signal are those in which filter is configured to distinguish a stationary signal from a transitory signal and those in which the filter includes a Wiener filter.

Other embodiments include those in which the signal processor is further configured to transition between broadcasting the raw audio signal into the cabin and broadcasting the filtered signal into the cabin.

Also among the embodiments are those that include an outbound audio channel that includes an external-loudspeaker set and an internal-microphone set. The external-loudspeaker set includes one or more exterior loudspeakers that are disposed to broadcast sound outside the vehicle. The internal-microphone set includes one or more internal microphones positioned to receive an audio signal from inside the cabin. In such embodiments, the signal processor is further configured to transition between broadcasting an audio signal detected by the internal-microphone set via the external-loudspeaker set and broadcasting an audio signal detected by the external-microphone set via the internal-loudspeaker set.

Further embodiments include a user interface that displays a visual alert when the filtered audio signal is being broadcast into the cabin. Among these are embodiments in which the user interface also displays a visual indication of a characteristic of the filtered audio signal when the filtered audio signal is being broadcast into the cabin. Among these embodiments are those in which the visual indication identifies the existence, in the filtered audio signal, of at least one of: a siren, a back-up alarm, a vehicle horn, a proximity warning from a vehicle, a bicycle bell, a dog's bark, a crying child, a shouting voice, and a spoken utterance.

Further embodiments include those in which the signal processor is configured to apply the filter that has been selected based on a state of the vehicle.

Additional embodiments include an outbound audio channel that includes an external-loudspeaker set and an internal-microphone set. The external-loudspeaker set includes one or more exterior loudspeakers that are disposed to broadcast sound outside the vehicle. The internal-microphone set includes one or more internal microphones positioned to receive an audio signal from inside the cabin. The inbound and outbound channels collectively form a trans-cabin communication system.

Among the foregoing embodiments are those that include a user interface to provide an ability to control operation of the outbound audio channel. In such embodiments, the ability to control the outbound audio channels includes one or more of an ability to prevent the outbound audio channel from operating during selected periods of operation of the trans-cabin communication system, an ability to cause the outbound audio channel to carry noise, an ability to silence the outbound audio channel, and an ability to cause the outbound audio channel to transition between providing a signal from inside the cabin and playing selected programming.

In another aspect, the invention features a system that includes an audio input, an audio output, and a signal processor. The audio input is configured to receive a raw audio signal from an external-microphone set, which comprises one or more external microphones that are disposed outside a vehicle's cabin. The audio output is configured to transmit a filtered audio signal to an internal-loudspeaker set, which comprises one or more loudspeakers that are inside a vehicle's cabin. The signal processor is one that has been configured to filter the raw audio signal, thereby producing the filtered audio signal, and to transmit the filtered audio signal through the audio output to the internal-loudspeaker set.

In another aspect, the invention features a vehicle comprising a signal processor, a cabin in which plural occupants ride and an outbound audio channel connected to the signal processor to permit audio from inside the cabin to be communicated outside the vehicle. The outbound audio channel includes plural internal microphones and an external-loudspeaker set that includes at least one external loudspeaker. The signal processor is configured to form a weighted sum of microphone signals from the internal microphones and to provide the weighted sum to the external-loudspeaker set. As a result, it is possible to weight the microphone signals in such a way that all occupants are perceived from outside as having spoken at the same volume regardless of their positions relative to the internal microphones and regardless of actual differences between the volumes of their respective voices.

Other features and advantages of the invention are apparent from the following description, and from the claims, in which:

BRIEF DESCRIPTION OF THE DRAWINGS

FIG. 5 shows a signal processor similar to that shown in FIG. 3 but configured to provide occupants of the vehicle with cues as to where a particular signal is coming from;

DETAILED DESCRIPTION

Figure 1:
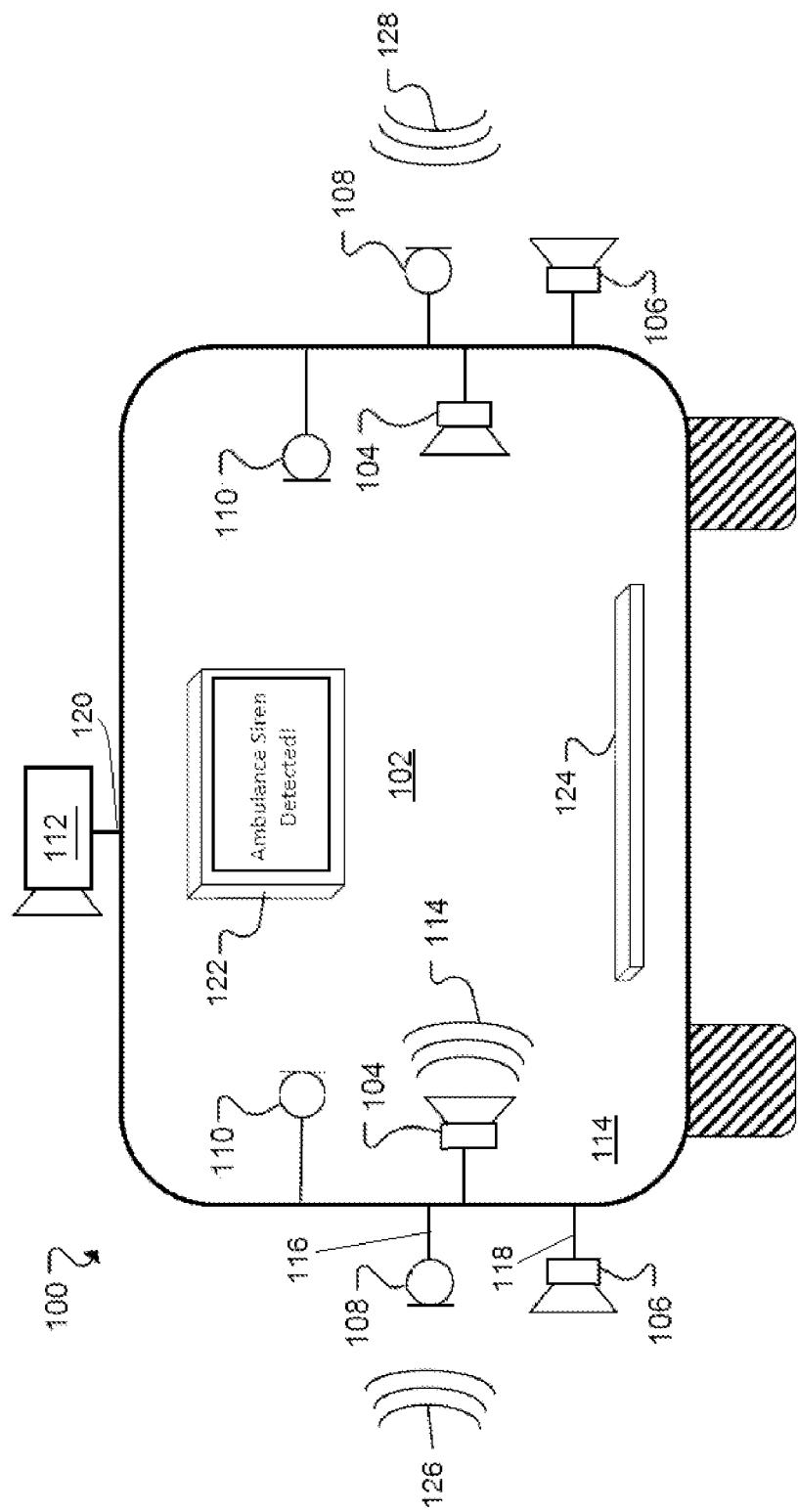
FIG. 1 is a cross-section of a vehicle.

FIG. 1 is a cross-section of a vehicle 100 showing its cabin 102. The cabin 102 accommodates one or more occupants. The illustrated vehicle is a motorized vehicle configured for travel along roads. Examples of such vehicles include automobiles, trucks, vans, and sport-utility vehicles.

The vehicle 100 includes an internal-loudspeaker set that comprises one or more internal loudspeakers 104, an external-loudspeaker set that comprises one or more external loudspeakers 106, an external-microphone set that comprises one or more external microphones 108, an internal microphone set that comprises one or more internal microphones 110, and an external-camera set that comprises at least one camera 112. These cooperate to form a trans-cabin communication system 114 in which the external microphones 108 and internal loudspeakers 104 form an inbound audio channel 116, the internal microphones 110 and external loudspeakers 106 form an outbound audio channel 118, and the camera 112 forms an inbound video channel 120.

In a preferred embodiment, the inbound and outbound channels 116, 118 are simultaneously operable, as a result of which the trans-cabin communication system 114 is full duplex. Such a trans-cabin communication system 114 permits two-way communication between an occupant of the cabin 102 and an entity outside the vehicle 100 without the need to open a window or door.

The vehicle 100 also includes a user-interface 122. In some implementations, the user-interface 122 includes a screen of a vehicle infotainment system. In other implementations, the user-interface 122 includes one or more lights that are activated in conjunction with a transmitted audio signal.

The user-interface 122 provides a location for implementing a human-machine interface to control the trans-cabin communication system 114, for example by controlling the operation of the external and internal microphones 108, 110, the operation of the internal and external loudspeakers 104, 106, the availability of the inbound audio and outbound audio channels 116, 118, and operation of the camera 112, including pointing the camera 112 in a desired direction so as to cause an image to be displayed on the screen of the infotainment system.

The user-interface 122 thus provides a way to manually activate, pause, or stop operation of the inbound audio channel 116, the outbound audio channels 118, or the inbound video channel 120 in any combination.

In addition, the user-interface 122 provides the ability to operate the trans-cabin communication system 114 in a private mode. Private mode disables the outbound audio channel 118, thus enabling occupants to talk amongst themselves without a person outside the vehicle 100 being able to listen, provide of course that the windows are shut.

In some cases, conversation amongst the occupants is loud enough to be partially audible outside the vehicle 100 even with the outbound audio channel 118 having been disabled. To further ensure privacy, the private mode provides the ability to play a masking sound through the external loudspeakers 106. Examples of suitable masking sounds include stationary noise or music.

The vehicle 100 also includes signal processor 124 with which the microphones 108, 110, loudspeakers 104, 106, and camera 112 are in data communication. The signal processor 124 distinguishes desirable audio signals 126 from undesirable audio signals 128 and ultimately transmits a filtered audio signal 128 into the driving cabin via one or more of the internal loudspeakers 104. In addition, the signal processor 124 determines weights to apply to any one or more of the microphones 108, 110 and the loudspeakers 104, 106 while operating the trans-cabin communication system 114.

The external microphones 108 are mounted on the vehicle 100 so as to permit them to detect audio signals 126, 128 from sources outside the cabin 102. A convenient place to mount the external microphones 108 is to integrate them into an existing antenna module.

In some implementations, signals provided by the external microphones 108 are used to estimate the direction-of-arrival of an audio signal 126, 128. The number of external microphones 108 governs the resolution with which this can be accomplished. Practical embodiments, include two, three, or four external microphones 108.

The internal microphones 110 are mounted in the vehicle 100 such that they detect audio signals from the occupants inside the driving cabin 102. Embodiments include those in which each seat in the cabin 102 has its own internal microphone 110. The signal processor 124 sums the signals from the internal microphones 110 and provides them to the external speakers 106.

When using the trans-cabin communication system 114, it is useful for all occupants in the cabin to be perceived, by a listener outside the vehicle 100, as having voices of roughly equal amplitude. Since the occupants are at different locations relative to the internal microphones 110, there is no guarantee that this will be the case. As a result, in some embodiments, the signal processor 124 applies different complex-valued weights to the signals received from the internal microphones 110 and provides the resulting weighted sum to the external loudspeakers 106.

The signal processor's ability to weight signals is particularly useful in connection with ensuring that spatial cues from outside the vehicle 100 are made available to occupants of the cabin 102. A difficulty that arises when simply passing a signal into the cabin is that the occupant may have a mistaken impression of where the sound is coming from.

As an example, if the external microphones 108 detect a siren from the left of the vehicle 100 and the signal processor 124 simply passes that sound to all of the internal loudspeakers 104, then each loudspeaker 104 will play the siren at the same amplitude. Thus, the occupants will have the impression that sirens are present in every direction.

The availability of plural internal loudspeakers 104 makes it possible to weight the outputs of the individual internal loudspeakers 104 makes it possible to provide spatial cues to suggest a location from which a sound from outside the vehicle 100 originated. For example, if, as a result of having exercised the ability of the external microphones 108 to determine a direction-of-arrival of an audio signal, it has been determined that a sound has arrived from a particular direction, it becomes possible to apply suitable complex weights to the outputs of the internal loudspeakers 104 in such a way as to cause the occupants of the cabin 102 to perceive that sound as coming from that direction. The details of this operation, referred to as "spatialization," are discussed in connection with FIGS. 5 and 8.

The availability of plural external loudspeakers 106 makes it possible to control the direction in which the vehicle 100 emits sound. For example, if a sound is to be directed towards a particular angle, only those speakers that face in the general direction of that angle are activated. This feature is particularly useful in those cases in which one wishes to communicate with a person or machine that is on one side of the vehicle 100. In such cases, it is desirable to deactivate those external loudspeakers 106 that face away from that side of the vehicle 100.

For example, when communicating with a person who is standing by one side of the vehicle, it is possible for an occupant, using the user-interface 122, to both disable those external loudspeakers 106 that are not useful for such interaction and to steer the beam formed by external microphones 108 in whatever direction is most useful for such interaction.

The availability of plural external microphones 108 makes it possible to receive sounds from any direction. However, it also opens up the possibility of applying complex weights to the outputs of those external microphones 108, thereby forming a steerable microphone array. Embodiments include those in which an occupant steers the beam using the user-interface 122 and those in which the beam steers itself automatically, for example by source localization.

Figure 2:
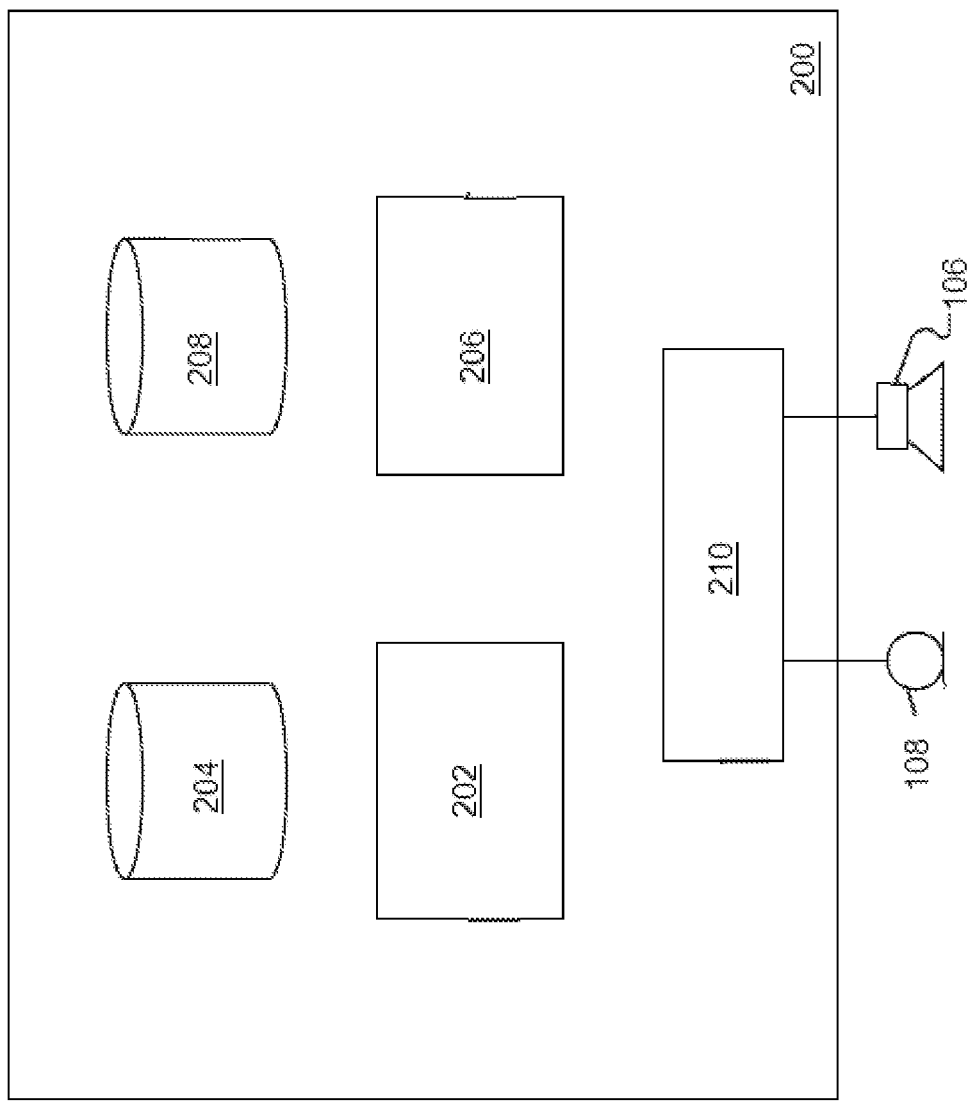
FIG. 2 shows a sound-filtering system installed in the vehicle shown in FIG. 1.

FIG. 2 shows hardware for implementing a filtering system 200 within the vehicle 100. The filtering system 200 includes a filter selector 202, vehicle-state data 204, a filter calculator 206, one or more sound models 208, and an input/output module 210 that is connected to an external microphone 108 and an internal loudspeaker 106.

The filter selector 202 selects filter characteristics that will be used to distinguish desirable and undesirable audio signals. For the sake of clarity and convenience, the words "desirable" and "undesirable" are used in this document in connection with audio signals. In the context of a particular filter, a "desirable" signal is a signal that satisfies the conditions for re-transmission into the cabin of a vehicle. In the context of a particular filter, the words "desirable" or "undesirable" are not meant to connote any subjective valuation or characterization of an audio signal. Instead, an "undesirable" audio signal is anything removed by a particular filter, and a "desirable" one is anything that is passed through to the cabin.

During operation, a vehicle 100 transitions between various vehicle states. In some implementations, it is advantageous to use different filter characteristics in different vehicle states. For example, when the vehicle is in the state of moving in reverse, a filter that is relatively permissive to spoken utterances is appropriate to mitigate the risk of accidents. In contrast, when a vehicle 100 is in the state of being a parked, the low risk of accidents makes a less permissible filter desirable.

In the illustrated embodiment, the filter selector 202 accesses vehicle-state data 204 to identify the vehicle's state. This vehicle-state data 204 includes any measurable data about the car or its environment. Examples of vehicle-state data 204 include the vehicle's speed, its direction of travel, its tachometer reading, and the vehicle's engine-noise level, which is readily measured by one or more on-board microphones. Other examples of vehicle-state data 204 include which gear is engaged, whether any subsystem (e.g., the radio subsystem or the air-conditioning subsystem) is activated, and if so, what those subsystems' settings are, ambient temperature as measured by one or more thermometers, the vehicle's location as measured by GPS, and various user preferences, such as how permissive or aggressive the level of sound filtering should be set.

The ensemble of all possible vehicle states, including user preferences defines a vehicle-state space. In some embodiments, the vehicle-state space is partitioned into non-overlapping regions such that a set of unique filter characteristics is associated with each region. In this case, the filter calculator 206 determines the set of unique filter characteristics associated with the current vehicle state.

Once particular filter characteristics have been selected, the filter calculator 206 is operable to filter incoming audio signals using the selected filter. Further details of filter computation are provided below.

In some implementations, the filter includes a Wiener filter. A Wiener filter is used to distinguish stationary audio signals from transitory audio signals. As used herein, a stationary signal is one whose spectrum is approximately constant over time. A transitory signal is a signal that is not a stationary signal.

In this context, "approximately constant" means constant to within a pre-defined threshold supplied by a user or a manufacturer. In the context of operating a vehicle, road noise and engine noise are significant contributors of stationary audio signals and may therefore be filtered out by some filters.

In some implementations, the filter involves one or more classifications of input sounds. Examples include a filter classifies an input audio signal as being a siren, a back-up alarm, a vehicle horn, a proximity warning from a vehicle, a bicycle bell, a dog's bark, a crying child, a shouting voice, or a spoken utterance. Such filters are created in a variety of ways, among which is that of training one or more machine-learning algorithms on various inputs that have been pre-classified as falling into these categories.

In a typical case, a human carries out the pre-classification and a machine-learning algorithm uses the initial classification to learn how to classify on its own. Examples of machine-learning algorithms include neural nets and deep-learning algorithms.

In some implementations, acoustic features corresponding to the signals described above are provided as input to the machine learning algorithms. Such features are embodied in various ways, such as by Mel-frequency Cepstral Coefficients (MFCC), a magnitude spectrum and/or logarithmic magnitude spectrum, spectral centroids, time samples, and noise estimates.

In those implementations that include classification of input signals, the filter calculator 206 refers to one or more pre-defined sound models 208. Such sound models 208 embody the result of pre-computation used to characterize a given input audio signal as belonging to one or more classifications, such as a siren, a back-up alarm, a vehicle horn, a proximity warning from a vehicle, a bicycle bell, a dog's bark, a crying child, a shouting voice, or a spoken utterance.

In some cases, an occupant of the vehicle 100 becomes interested in all audio signals 126, 128 from outside the cabin 102. In such cases, the occupant activates a toggle control that re-broadcasts whatever the external microphones 108 are receiving directly into the cabin 102. This signal, which remains unfiltered, will be referred as the "raw audio signal."

To enhance the occupant's experience, the filtering system 200 carries out a spatialization procedure, which is discussed in connection with FIGS. 5 and 8, before re-broadcasting the raw audio signals into the cabin 102. As a result of this procedure, In some implementations, activating the toggle control also engages a "conversation mode" that activates the trans-cabin communication system 114. This permits an occupant of the vehicle 100 to converse with a person outside the vehicle 100 and to do so without having to roll down a window or open a door. This may be desirable, for example, in inclement weather or in an effort to enhance security.

Yet other techniques for identifying audio signals of interest are possible. Examples of such techniques are described in U.S. patent application Ser. No. 16/516,786, U.S. Pat. App. 62/957,290, U.S. Pat. App. 62/986,018, and U.S. Pat. App. 62/962,278, each of which is hereby incorporated by reference in its entirety herein.

Figure 3:
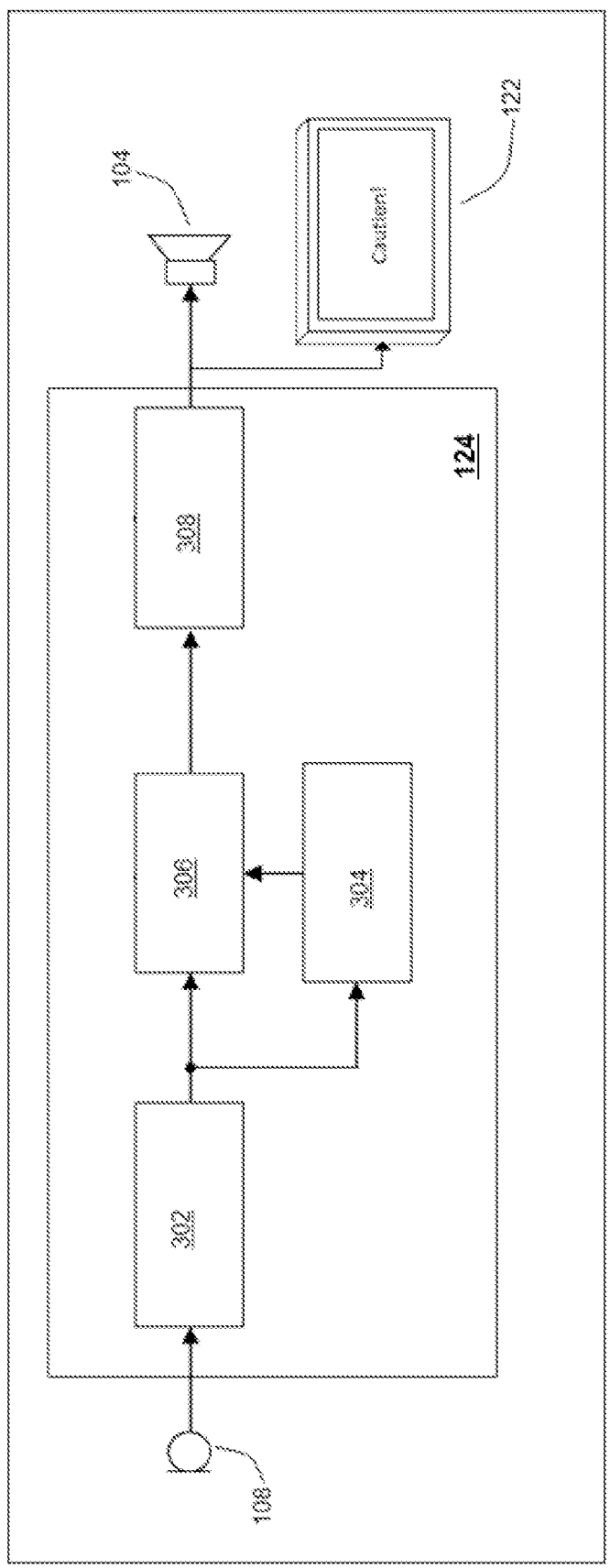
FIG. 3 shows a signal processor having circuitry for carrying out a filtering operation.
Figure 6:
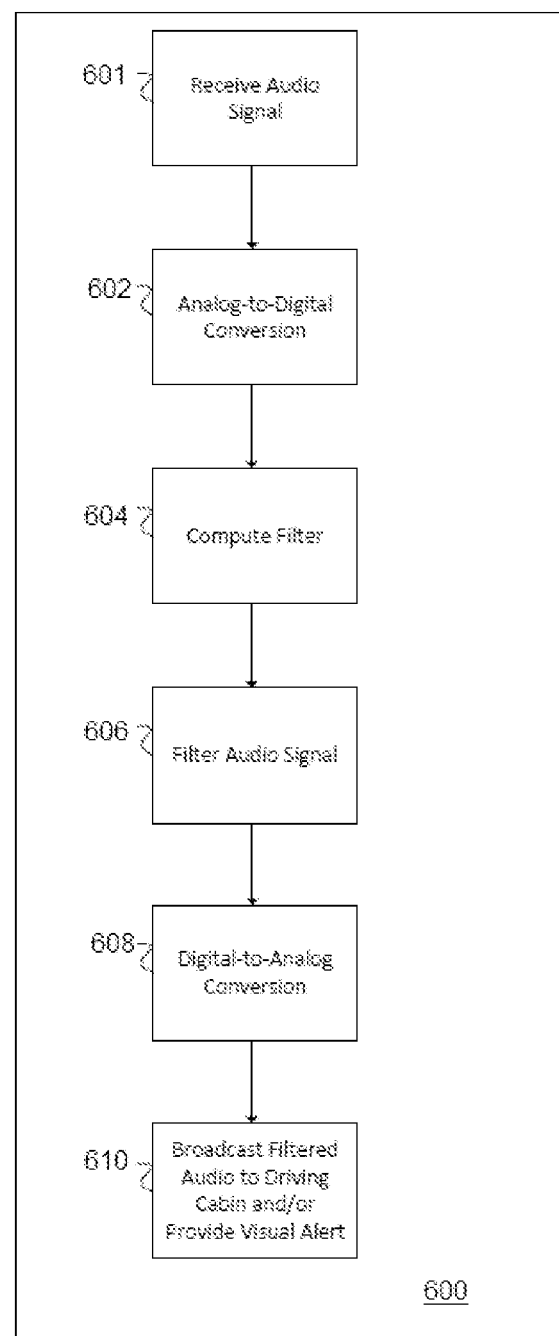
FIG. 6 shows the method carried out by the signal processor of FIG. 3.

FIG. 3 shows hardware for carrying a filtering method as shown in FIG. 6.

The illustrated hardware includes an A/D converter 302 that receives an analog signal from an external microphone 108. The resulting digital signal is provided to a filter calculator 304 and to a filter 306 that receives calculated results from the filter calculator 304. The filter 306 filters the signal and provides the filtered signal to a D/A converter 308 for communication to occupants of the cabin via an internal loudspeaker 104 or using the display at the user interface 122.

The method 600 begins with receiving a raw audio signal (step 601) and carrying out analog-to-digital conversion (step 602).

Based on pre-selected filter characteristics, the filter calculator 304 computes the effect of the filter on the raw audio signal (step 604) and provides it to the filter 306. The filter 306 uses the result to filter the raw audio signal (step 606), thereby producing a filtered audio signal.

The D/A converter 308 converts the filtered audio signal to an analog signal (step 608) and provides it for broadcast into the cabin 102 via the user-interface 122 or an internal loudspeaker 104 (step 610).

In some implementations, the foregoing procedure results in a visual alert. One example of a visual alert is a message on the user interface 122 vehicle's infotainment screen. Another example of a visual alert is activating one or more cabin lights.

In other implementations, the broadcasting step 610 includes applying a gain factor to the filtered signal at the internal loudspeaker 104 to increase the likelihood of drawing the occupant's attention, thus reducing the risk of missing the alert altogether. Among these implementations are those that include determining the gain factor based on ambient acoustic conditions within the cabin 102.

Examples of conditions used to determine the gain factor include the properties of road noise and/or engine noise, including amplitude and/or frequency, whether measured directly or determined from a model based on the engine's state), the volume level of the vehicle's stereo, and/or an ambient cabin noise level from other sources, such as passenger conversation or audio playback on an external device, both of which are measurable by an internal microphone 110.

In still other implementations, the broadcasting step 610 includes reducing or otherwise adjusting the volumes of one or more other audio sources to enhance the driver's perception of the broadcasted audio. Examples of such audio sources include an in-vehicle entertainment system and telephone audio played through the vehicle's speakers.

Figure 4:
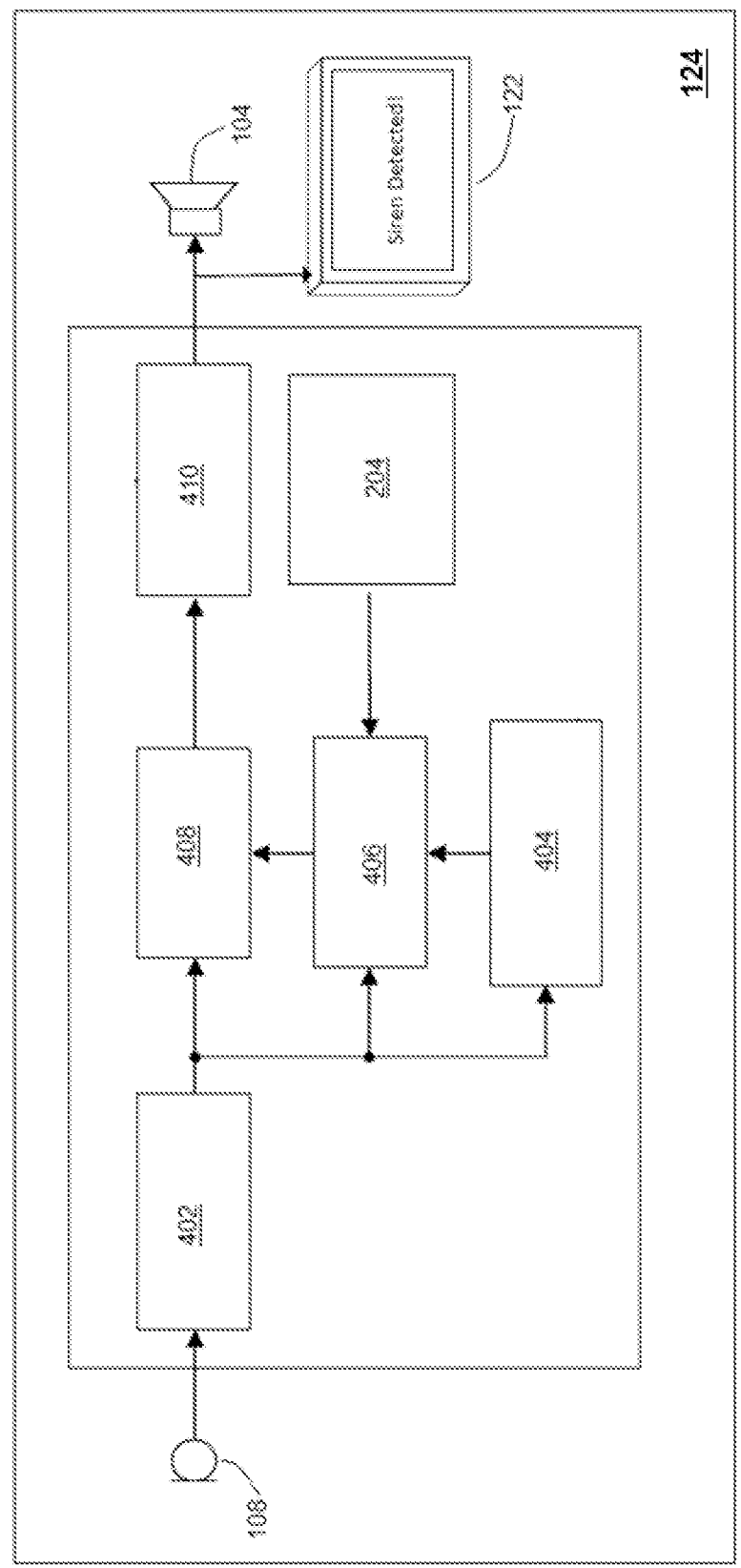
FIG. 4 shows a signal processor similar to that shown in FIG. 3 but further configured to rely on vehicle-state information and on a classification of the type of acoustic signal received.
Figure 7:
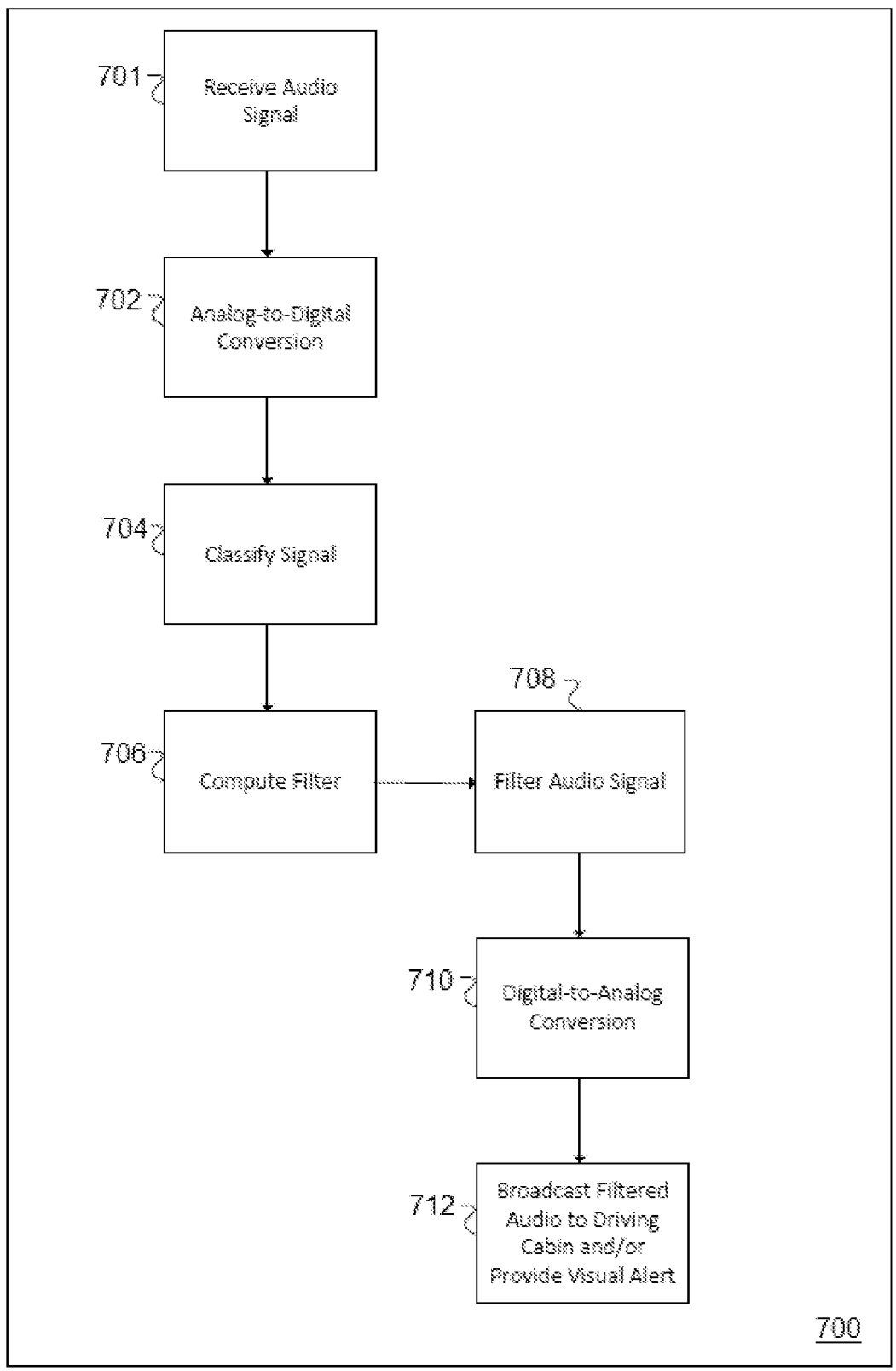
FIG. 7 shows the method carried out by the signal processor of FIG. 4.

FIG. 4 shows hardware for carrying out a more refined filtering method shown in FIG. 7.

The illustrated hardware includes an A/D converter 402 that receives an analog signal from an external microphone 108. The resulting digital signal is provided to a filter calculator 406, to a filter 408 that receives calculated results from the filter calculator 406, and to a sound classifier 404 that classifies the sound and provides the resulting class to the filter calculator 406. The filter 408 filters the signal and provides the filtered signal to a D/A converter 410 for communication to occupants of the cabin via an internal loudspeaker 104 or using the display at the user interface 122.

The method 700 begins with receiving a raw audio signal (step 701) and carrying out analog-to-digital conversion (step 702).

The sound classifier 404 then classifies relevant aspects of the raw audio signal during a classifying step 704. In some implementations, the raw audio signal is classified as containing a signal-of-interest. Examples of signals-of-interest include a siren, a back-up alarm, a vehicle horn, a proximity warning from a vehicle, a bicycle bell, a dog's bark, a crying child, a shouting voice, and a spoken utterance.

Based on a pre-selected filter, the filter calculator 406 carries out a computation step 706 in which it computes the effect of the filter on the raw audio signal. It then provides the result to the filter 408, which then filters the raw audio signal during a filtering step 708. In some embodiments, the filter calculator 406 uses received vehicle-state information to either select which filter characteristics to use and/or to determine certain parameters or coefficients in the selected filter.

In some implementations, the filtering step 708 includes an extraction step in which the filter 408 extracts the signal-of-interest from the raw audio signal.

In other implementations, the filter 408 replaces the raw audio signal, or a portion thereof, with a pre-recorded representative signal that corresponds to the signal-of-interest classified by the sound classifier 404 during the classifying step 704. For example, if the raw audio signal included an ambulance siren, the filter 408 would replace the raw audio signal with a pre-recorded sample of a siren during the filtering step 708.

The D/A converter 410 then converts the filtered audio signal into an analog signal (step 710) and provides it for broadcast into the cabin 102 (step 712). In some implementations, this includes providing a visual alert, such as displaying a message on the user interface 122, activating one or more cabin lights, or displaying information indicative of the classification carried out by the sound classifier 404 during the classifying step 704. For example, if the sound classifier 404 classified the raw audio signal as a siren, then the visual alert would reference a siren.

Figure 5:
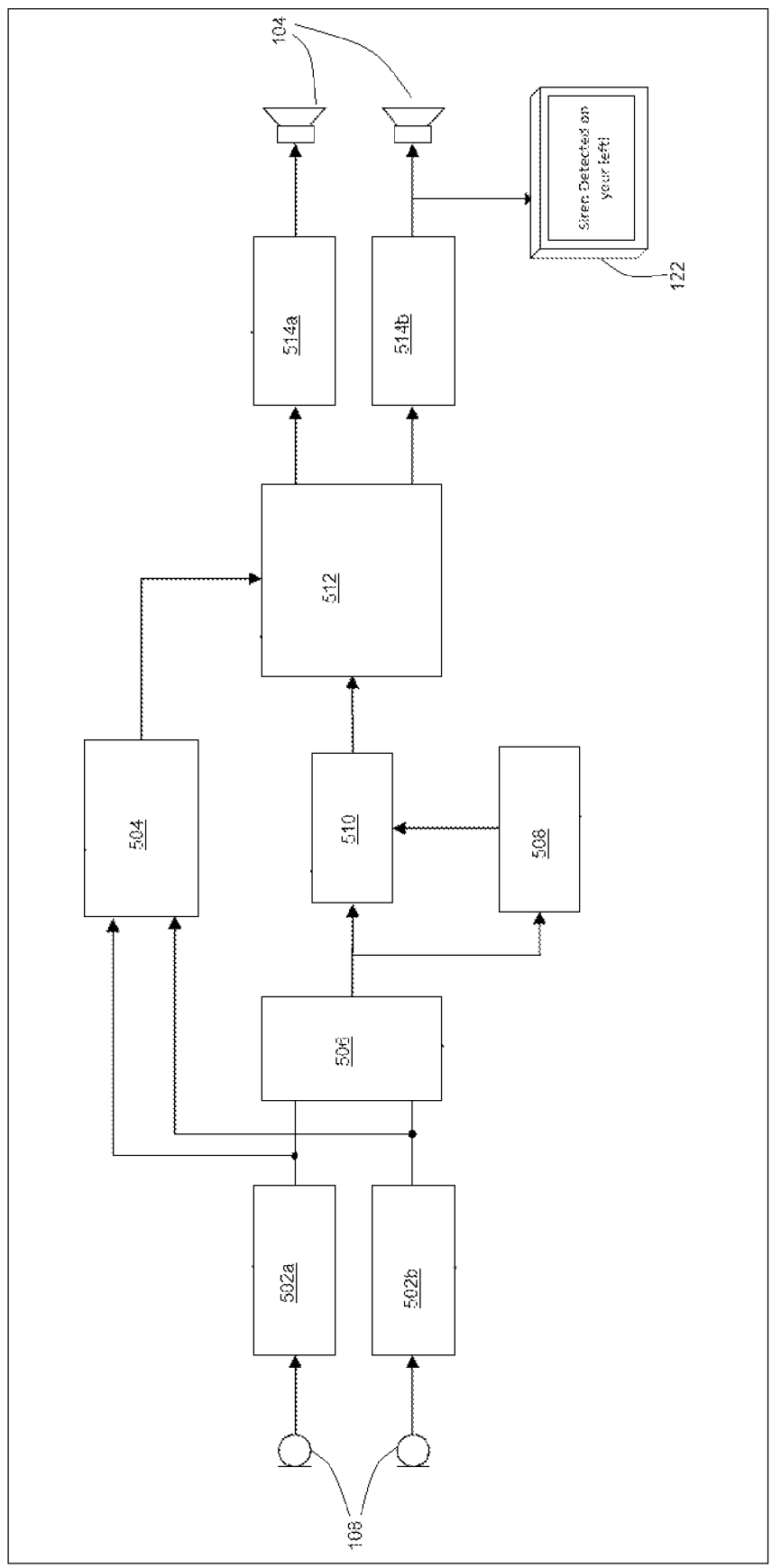
Figure 8:
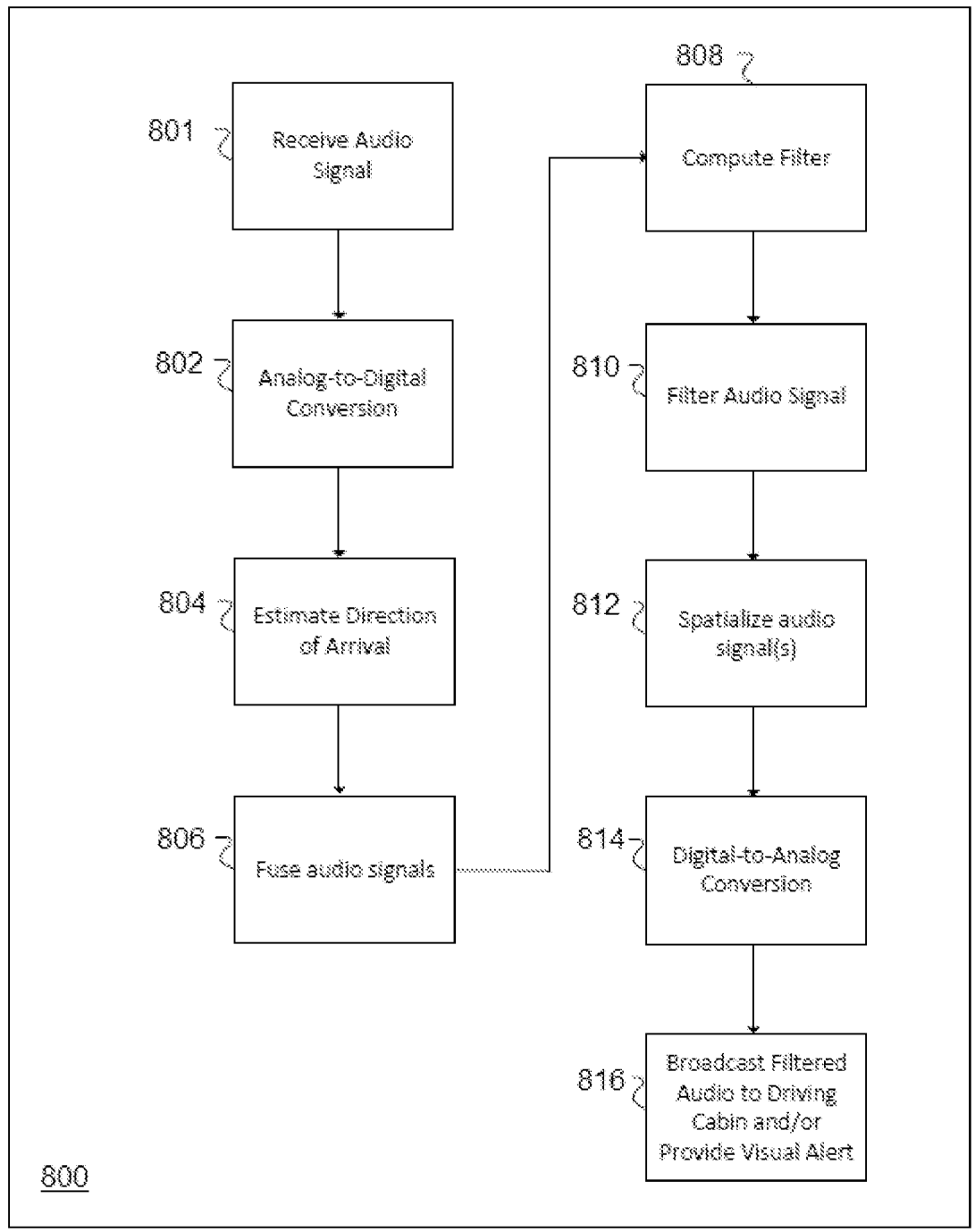
FIG. 8 shows the method carried out by the signal processor of FIG. 5.

FIG. 5 shows hardware for carrying out the filtering method shown in FIG. 8.

The illustrated hardware includes first and second A/D converters 502a, 502b, each of which connects to a corresponding external microphone 108. The resulting first and second digital signals are provided to a direction finder 504, which uses them to estimate a direction-of-arrival. The resulting estimate is provided to spatializing circuitry 512, which determines weights to apply to first and second output signals that are provided to corresponding first and second D/A converters 514a, 514b.

The outputs of the first and second A/D converters 502a, 502b are also provided to a signal fuser 506, which outputs a combined signal to both a filter calculator 508 and to a filter 510.

The method 800 begins with receiving raw audio signals (step 801) from corresponding external microphones 108 followed by A/D conversion at the first and second A/D converters 502a, 502b.

During an estimation step 804, the direction finder uses the two spatial samples provided by the two external microphones 108 to estimate a direction-of-arrival. In some embodiments, the direction finder 504 relies on a time lag or a phase difference between the signals provided by the external microphones 108, thereby computing a time-of-flight required for sound waves giving rise to corresponding features to travel from one microphone to another. This can then be used to direction-of-arrival via triangulation. Other methods for acoustic source localization or estimating direction-of-arrival based on signals from two or more different microphones are known in the art. Also among such methods are those that rely on outputs from various types of sensors, such as audio signals from the external microphones 108 and video signals from the camera 112 or from plural cameras.

Since the external microphones 108 are in different locations, one cannot simply add their signals together. Instead, during a fusing step 806, the fuser 506 fuses the raw audio signals into a single signal in a manner that avoids the interference that would result from simple addition. In some implementations, the fuser 506 adds time-shifted copies of input signals together, where the time shift is given by the time lag between corresponding features of each audio signal. Other techniques are known in the art for fusing the raw audio signals into a single signal. Examples include automatic microphone mixing and/or microphone diversity combining.

In some embodiments, the downstream hardware components have dual inputs, in which case there is no need to fuse the signals. Instead, the various signal processing steps are simply carried out separately for each external-microphone signal.

During a filter-calculation step 808, the filter calculator 508 uses pre-selected filter characteristics to compute the effect of the filter on the raw audio signal. The result is then provided to the filter 510, which proceeds to filter the raw audio signal during a filtering step 810.

In some implementations, the filter calculator 508 extracts a signal-of-interest from the raw audio signal(s), as described above.

In other implementations, the filter calculator 508 replaces the raw audio signal(s), or corresponding portions thereof, with a pre-recorded representative signal that corresponds to the nature of the signal-of-interest as provided by, for example, a classifier 404. For example, if the raw audio signal were found to comprise an ambulance siren, the filter calculator 508 would replace the raw audio signal with a pre-recorded sample of a siren. This is particularly useful to avoid confusion as a result of different jurisdictions having different types of sirens.

The filter 510 provides the filtered audio signal to spatializing circuitry 512 during a spatializing step 812. During the spatializing step 812, the spatializing circuitry 512 determines certain acoustic parameters with which to weight signals provided to the first and second D/A converters 514a, 514b. Examples of such weights are those that cause differences in volume and those that cause difference in timing. The selection of weights, together with information concerning an occupant's position and orientation, causes the sound perceived by the occupant to match the direction-of-arrival estimated by the direction finder 504.

The resulting filtered audio signals, suitably weighted, are converted into corresponding analog signals by the D/A converters 514a, 514b and broadcast into the cabin 102 during a broadcasting step 816.

In some implementations, the broadcasting step 816 includes providing a visual alert, such as displaying a message on the user interface 122 or activating one or more cabin lights.

In other implementations, the visual alert incorporates the estimate of direction-of-arrival provided by the direction finder 504. For example, if the raw audio signals were determined to have arrived from the left side of the vehicle, the visual alert would then reference the left side of the vehicle.

The systems, methods, components, or other approaches described above may be implemented in software, or in hardware, or a combination of hardware and software. The software may include instructions stored on a non-transitory machine-readable medium, and when executed on a general-purpose or a special-purpose processor implements some or all of the steps summarized above. The hardware may include Application-Specific Integrated Circuits (ASICs), Field Programmable Gate Arrays (FPGAs), and the like. The hardware may be represented in a design structure. For example, the design structure comprises a computer accessible non-transitory storage medium that includes a database representative of some or all of the components of a system embodying the steps summarized above. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, alternatively, the database may itself be the netlist (with or without the synthesis library) or the data set. The foregoing description only describes a non-abstract implementation. The claims that follow are limited to non-abstract implementations that cause technical effects. Any person who construes the claims as reading on abstract implementations would simply be failing to construe the claims in light of the specification and infringing on the applicant's lexicographic rights. Any person who fails to see a technical effect is simply one who lacks the ability to appreciate the technical effect that exists. As used herein, the term "non-abstract" is the converse to the term "abstract" as that term has been defined by the courts of the United States as of the time of filing this application. A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. An apparatus comprising a vehicle configured for travel along a road, the vehicle comprising a cabin in which at least one occupant rides and an inbound audio channel, said inbound audio channel comprising an external-microphone set that includes one or more microphones disposed to receive a raw audio signal that represents sound from outside said cabin and an internal-loudspeaker set that comprises one or more loudspeakers disposed to radiate sound into said cabin in response to said external-microphone set having received said raw audio signal, and a signal processor that is configured to apply a filter to said raw audio signal to generate a filtered audio signal that is then broadcast into said cabin using said internal-loudspeaker set, wherein said raw audio signal comprises a first type of signal and a second type of signal, wherein said signal processor is configured to transition between broadcasting said raw audio signal into said cabin in response to having identified said first type of signal in said raw audio signal and broadcasting said filtered signal into said cabin in response to having failed to identify said first type of signal in said raw audio signal, wherein said signal processor is configured to process said filtered audio signal to include said first type of signal and to suppress said second type of signal.

2. The apparatus of claim 1, wherein the signal processor is further configured to identify a threat in said sound from outside said cabin and to do so based on a machine-learning algorithm that has been trained on pre-selected signals that correspond to threats.

3. The apparatus of claim 1, wherein said filter is configured to distinguish a stationary signal from a transitory signal, wherein said first type of signal is a transitory signal.

4. The apparatus of claim 1, wherein said filter comprises a Wiener filter.

5. The apparatus of claim 1, wherein the first type of signal comprises a siren.

6. The apparatus of claim 1, wherein said first type of signal comprises a back-up alarm.

7. The apparatus of claim 1, wherein said first type of signal comprises a horn sounded by another vehicle.

8. The apparatus of claim 1, wherein said first type of signal comprises a proximity warning sounded by another vehicle.

9. The apparatus of claim 1, wherein said first type of signal comprises a bicycle bell.

10. The apparatus of claim 1, wherein said first type of signal comprises a dog's bark.

11. The apparatus of claim 1, wherein said first type of signal comprises a crying child.

12. The apparatus of claim 1, wherein said first type of signal comprises a shouting voice.

13. The apparatus of claim 1, wherein said first type of signal comprises a spoken utterance.

14. The apparatus of claim 1, further comprising a user interface that is configured to display a visual alert when said filtered audio signal is being broadcast into said cabin.

15. The apparatus of claim 1, further comprising a user interface that is configured to display a visual indication of a characteristic of said first type of signal.

16. The apparatus of claim 1, wherein said signal processor is configured to provide spatial cues to suggest to said occupant a direction from which said first type of signal originated.

17. The apparatus of claim 1, wherein said internal-loudspeaker set comprises plural loudspeakers and wherein said signal processor is configured to estimate a direction from which said first type of signal originated and to weight outputs of said loudspeakers to cause said occupant to perceive said first type of signal as coming from said direction.

18. The apparatus of claim 1, wherein said signal processor is configured to estimate a direction-of-arrival of said first type of signal and to provide, in said cabin, a visual alert that incorporates the estimate of the direction-of-arrival.

* * * * *